US012737101B2

(12) United States Patent
Haruta et al.

(10) Patent No.: US 12,737,101 B2
(45) Date of Patent: Sep. 15, 2026

(54) INFORMATION PROCESSING DEVICE AND INFORMATION PROCESSING PROGRAM

(71) Applicant: FUJIFILM CORPORATION, Tokyo (JP)

(72) Inventors: Takafumi Haruta, Kanagawa (JP); Yuji Onozawa, Kanagawa (JP); Tatsuo Fukushima, Kanagawa (JP); Yohei Makino, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 362 days.

(21) Appl. No.: 18/579,490

(22) PCT Filed: Jul. 20, 2022

(86) PCT No.: PCT/JP2022/028227
§ 371 (c)(1),
(2) Date: Jan. 15, 2024

(87) PCT Pub. No.: WO2023/026727
PCT Pub. Date: Mar. 2, 2023

(65) Prior Publication Data

US 2024/0329816 A1 Oct. 3, 2024

(30) Foreign Application Priority Data

Aug. 25, 2021 (JP) ................................ 2021-137558

(51) Int. Cl.
*G06F 3/048* (2013.01)
*G06F 3/0482* (2013.01)
*G06F 3/04845* (2022.01)

(52) U.S. Cl.
CPC ........ *G06F 3/04845* (2013.01); *G06F 3/0482* (2013.01)

(58) Field of Classification Search
CPC .......................... G06F 3/04845; G06F 3/0482
See application file for complete search history.

(56) References Cited

U.S. PATENT DOCUMENTS 7,792,804 B2 * 9/2010 Tsutsumi ............. G06F 16/252 707/693
10,778,871 B1 * 9/2020 Taguchi .............. H04N 1/6011
(Continued)

FOREIGN PATENT DOCUMENTS

JP 2010-020533 A 1/2010
JP 2013-025369 A 2/2013
(Continued)

OTHER PUBLICATIONS

"Book 2015 to open when you are in trouble with Word & Excel", serial No. 552, Asahi Shimbun Publications Inc., Tonozaki Co., Mar. 30, 2015, p. 195.
(Continued)

*Primary Examiner* — Linh K Pham
(74) *Attorney, Agent, or Firm* — SOLARIS Intellectual Property Group, PLLC

(57) ABSTRACT

An information processing device including a processor. The processor displays plural items of prepared information prepared by a user and also displays a color index for selecting a color to identify prepared information to be priority-displayed, receives a selection of a color from the color index, and priority-displays the prepared information identified by the color received.

10 Claims, 18 Drawing Sheets

(56) References Cited

U.S. PATENT DOCUMENTS

| | | | | |
|---|---|---|---|---|
| 2001/0024584 | A1* | 9/2001 | Kurosawa | G06K 15/129 358/1.9 |
| 2004/0049469 | A1* | 3/2004 | Saruhashi | G06Q 10/00 705/79 |
| 2004/0096234 | A1* | 5/2004 | Kurahashi | G03G 15/6538 399/82 |
| 2004/0257598 | A1* | 12/2004 | Fujio | H04N 1/6011 358/1.9 |
| 2004/0257615 | A1* | 12/2004 | Yamamuro | G06F 3/1204 358/1.15 |
| 2005/0206925 | A1* | 9/2005 | Agehama | G06K 15/02 358/1.9 |
| 2006/0146065 | A1* | 7/2006 | Wada | H04N 9/73 345/590 |
| 2007/0242286 | A1* | 10/2007 | Heo | G06F 3/1248 358/1.6 |
| 2009/0180685 | A1* | 7/2009 | Fowler | H04N 1/4078 382/167 |
| 2009/0219583 | A1* | 9/2009 | Ito | H04N 1/00806 358/474 |
| 2009/0323143 | A1* | 12/2009 | Nakamura | H04N 1/32106 358/518 |
| 2013/0246973 | A1 | 9/2013 | Tomiyasu et al. | |
| 2014/0173515 | A1* | 6/2014 | Efrati | G06Q 10/109 715/811 |
| 2016/0092439 | A1* | 3/2016 | Ichimi | G06F 40/129 715/265 |
| 2020/0349225 | A1* | 11/2020 | Agrahari | G06F 16/219 |

FOREIGN PATENT DOCUMENTS

| | | | |
|---|---|---|---|
| JP | 2013-077239 | A | 4/2013 |
| JP | 2013-137477 | A | 7/2013 |
| JP | 2013-191178 | A | 9/2013 |
| JP | 2013-222379 | A | 10/2013 |
| JP | 2014-006579 | A | 1/2014 |
| JP | 2018-036855 | A | 3/2018 |

OTHER PUBLICATIONS

"Be ready Excel 2013", 1st edition, Impress Corporation, Kodate Yoshinori & dekiru series editing department, Aug. 1, 2015, pp. 208-209.

"Be ready Excel database: Master book for data extraction and analysis", 1st edition, Impress Japan KK, Hayasaka Kiyoshi & dekiru series editing department, Jun. 21, 2012, pp. 162-165.

"Outlook [Strongest] Techniques for saving time at work. Techniques for getting done with the email process quickly", 1st edition, Gijutsu-Hyoron Co., Ltd., Moriya Keiichi, Dec. 19, 2019, pp. 163-166.

English language translation of the following: Office action dated Sep. 9, 2025 from the JPO in a Japanese patent application No. 2021-137558 corresponding to the instant patent application. This office action translation is submitted now in order to supplement the understanding of the cited reference which is being disclosed in the instant Information Disclosure Statement.

* cited by examiner

FIG.2

PREPARED INFORMATION DATABASE

| NAME [in Chinese Characters or Latin script] | NAME-READING [in phonetic or Latin script] | FACSIMILE NUMBER | EMAIL ADDRESS | LISTING COLOR |
|---|---|---|---|---|
| AOYAMA Jiro | AOYAMA Jiro | 123456789 | aoy@fuji.com | R:24 G:3 B:177 |
| KIKUCHI Jiro | KIKUCHI Jiro | 123456789 | kik @fuji.com | R:43 G:28 B:152 |
| YAMADA Taro | YAMADA Taro | 123456789 | yam @fuji.com | R:9 G:40 B171 |
| John Smith | John Smith | 123456789 | joh @fuji.com | R:180 G:0 B:0 |
| : | : | : | : | : |

FIG.7

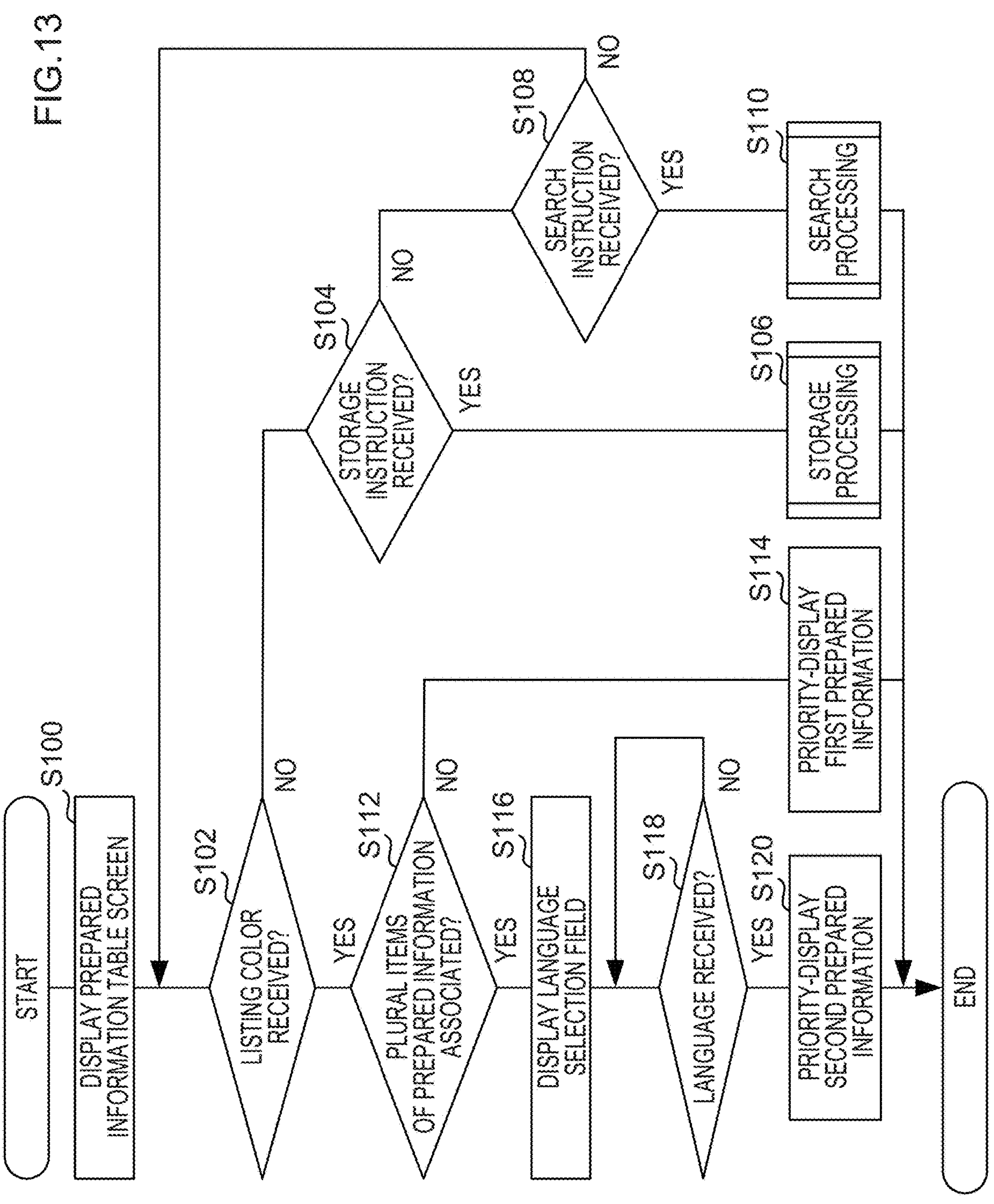
FIG.13
START
S100
DISPLAY PREPARED INFORMATION TABLE SCREEN
S102
LISTING COLOR RECEIVED?
YES
NO
S104
STORAGE INSTRUCTION RECEIVED?
YES
NO
S106
STORAGE PROCESSING
S108
SEARCH INSTRUCTION RECEIVED?
YES
NO
S110
SEARCH PROCESSING
S112
PLURAL ITEMS OF PREPARED INFORMATION ASSOCIATED?
YES
NO
S114
PRIORITY-DISPLAY FIRST PREPARED INFORMATION
S116
DISPLAY LANGUAGE SELECTION FIELD
S118
LANGUAGE RECEIVED?
YES
NO
S120
PRIORITY-DISPLAY SECOND PREPARED INFORMATION
END

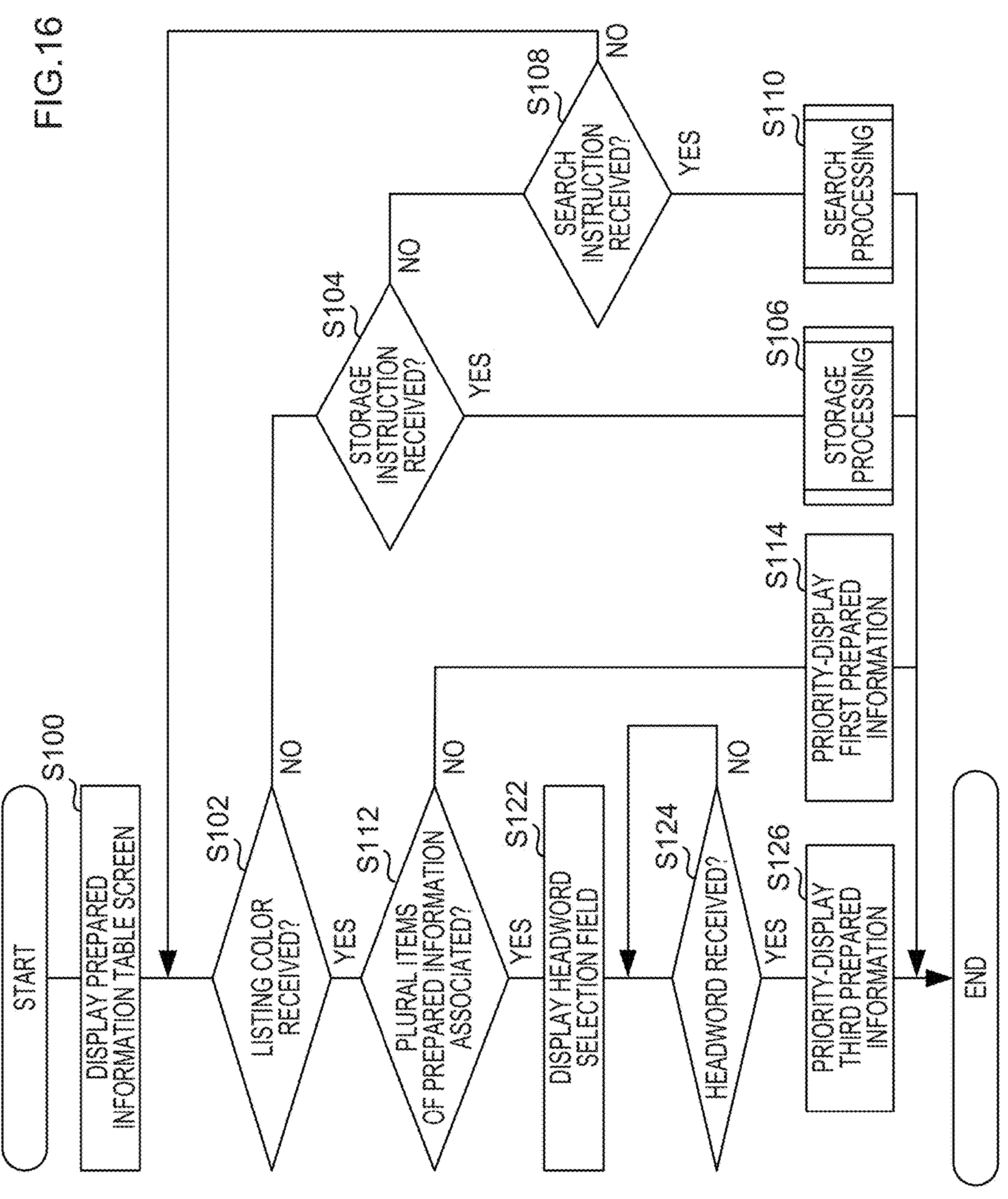
FIG.16
START
S100
DISPLAY PREPARED INFORMATION TABLE SCREEN
S102
LISTING COLOR RECEIVED?
YES
NO
S104
STORAGE INSTRUCTION RECEIVED?
YES
NO
S106
STORAGE PROCESSING
S108
SEARCH INSTRUCTION RECEIVED?
YES
NO
S110
SEARCH PROCESSING
S112
PLURAL ITEMS OF PREPARED INFORMATION ASSOCIATED?
YES
NO
S114
PRIORITY-DISPLAY FIRST PREPARED INFORMATION
S122
DISPLAY HEADWORD SELECTION FIELD
S124
HEADWORD RECEIVED?
YES
NO
S126
PRIORITY-DISPLAY THIRD PREPARED INFORMATION
END

INFORMATION PROCESSING DEVICE AND INFORMATION PROCESSING PROGRAM

TECHNICAL FIELD

The present disclosure relates to an information processing device and an information processing program.

BACKGROUND ART

An information device provided with a touch panel for displaying an operation screen including a scroll display area is disclosed in Japanese Patent Application Laid-Open (JP-A) No. 2013-191178 (Patent Document 1). This information device includes a data storage section to store plural data respectively classified into one out of three or more groups having a predetermined array sequence. Moreover, this information device includes a list display control section to display a data list of plural data classified in the same group in a single row inside the scroll display area. Moreover, this information device includes a scroll control section to scroll display of the data list according to a touch operation in which, in a state in which the data list is being displayed, a portion in the scroll display area is touched on a touch input screen of the touch panel then while still touching the touched position is moved along one direction. Moreover, this information device includes an assistance display control section that in response to the touch operation, causes pop-up display so as to display plural icons, which serve as indicators corresponding to each of plural groups including a group corresponding to data that is part of the three or more groups and is being displayed inside the scroll display area so as to be displayed in the array sequence on the operation screen in a row along one direction.

A scroll control device is disclosed in JP-A 2013-077239 (Patent Document 2). The scroll control device includes a display section for displaying on a display screen a list including plural regions contiguous in a specific direction, and an input section to receive a scroll operation input to scroll the list in the specific direction. The scroll control device also includes a scroll control section for executing the scrolling according to a scroll operation input by the input section, and to determine a display mode of the list being scrolled. Moreover, the scroll control device includes a list display control section for controlling such that the display section displays the list on the display screen according to the display mode determined by the scroll control section. Note that the scroll control section controls such that, from a final area where display on the display screen ends across to an initial area where display on the display screen starts, the information appearing in the area is displayed large.

A display control device is disclosed in JP-A 2013-025369 (Patent Document 3) that controls display of an operation display device including a display section and an operation section to receive a user operation. This display control device displays a list recorded with plural selection items in a list display area of the display section, and when a scroll operation is received on the list display area being displayed, displays on the display section an index of plural divided groups of the selected items recorded in the list. The display control device then, on receiving a group selection operation from out of the index displays a selected item corresponding to the selected group in the list display area.

SUMMARY OF INVENTION

Technical Problem

Sometimes an index is employed to facilitate finding the location of information. For example, sometimes an index is employed to facilitate finding the location of prepared information that has been prepared by a user. In such cases, there might be an increase in the number of headwords employed in the index as the number of items of prepared information increases. The headwords are displayed as characters, and so even if the size of the characters is adjusted, there is still a limit to the number of headwords displayable in a given display area.

An object of the present disclosure is to provide an information processing device and an information processing program that are capable of comparing a headword against an index being displayed and of displaying an index not limited in the number of items of displayable information.

Solution to Problem

In order to achieve the above object, an information processing device according to a first aspect includes a processor. The processor displays plural items of prepared information prepared by a user and also displays a color index for selecting a color to identify the prepared information to be priority-displayed, receives a selection of a color from the color index, and priority-displays the prepared information identified by the color received.

Moreover, an information processing device according to a second aspect is the information processing device according to the first aspect, wherein the processor, in a case in which the prepared information associated with the color received has been stored in different languages, receives a language after the color has been received from the color index, and priority-displays the prepared information stored in the language received.

Moreover, an information processing device according to a third aspect is the information processing device according to the first aspect or the second aspect, wherein the processor, in a case in which there are different headwords for the prepared information associated with the color received, receives a headword after the color has been received from the color index, and priority-displays the prepared information related to the headword received.

Moreover, an information processing device according to a fourth aspect is the information processing device according to any aspect from the first aspect to the third aspect, wherein the processor, in a case in which the prepared information it to be stored, displays a color identification table for selecting a color to identify prepared information to be stored, receives the color from the color identification table, and stores the color received as the color to identify the prepared information to be stored.

Moreover, an information processing device according to a fifth aspect is the information processing device according to the fourth aspect, wherein the processor displays the color already identifying the prepared information in the color identification table so as to be distinguished from the color not yet identifying the prepared information.

Moreover, the information processing device according to a sixth aspect is the information processing device according to any aspect from the first aspect to the fifth aspect, wherein the processor displays the plural items of prepared information such that the prepared information having different colors for the color for identification are arranged in sequence determined by the color, the prepared information having a same color for the color for identification are arranged in sequence determined by a language in which the prepared information is stored, and the prepared information having the same color for identification and having the same language of storage are arranged in sequence determined by a headword of the prepared information.

Moreover, an information processing device according to a seventh aspect is the information processing device according to the sixth aspect, wherein the processor receives a change to at least one sequence from among the sequence determined by the color, the sequence determined by the language, or the sequence determined by the headword.

Moreover, an information processing device according to an eighth aspect is the information processing device according to any aspect from the first aspect to the seventh aspect, wherein the processor displays a color search table for selecting the color to identify the prepared information to be searched, and displays the prepared information identified by the color received from the color search table.

Moreover, an information processing device according to a ninth aspect is the information processing device according to any aspect from the first aspect to the eighth aspect, wherein the prepared information is information representing a contact.

Moreover, an information processing device according to a tenth aspect is the information processing device according to any aspect from the first aspect to the ninth aspect, wherein the prepared information is information representing a print job.

Moreover, an information processing device according to an eleventh aspect is the information processing device according to any aspect from the first aspect to the tenth aspect, wherein the processor displays the plural items of prepared information and the color index at the same time, receives a selection of a color from the color index, and priority-displays the prepared information identified by the color received.

An information processing program according to a twelfth aspect causes a computer to execute processing including displaying plural items of prepared information prepared by a user and also displaying a color index for selecting a color to identify the prepared information to be priority-displayed, receiving a selection of the color from the color index, and priority-displaying the prepared information identified by the color received.

The first aspect and the twelfth aspect enable display of an index less restricted in number of items of information displayable than an index to display headwords.

The second aspect enables priority-display of prepared information stored in a language received when the prepared information associated with a color received is stored in different languages.

The third aspect enables priority-display of prepared information related to a headword received when the prepared information associated with a color received has different headwords.

The fourth aspect enables selection of a color to identify the prepared information to be stored when storing prepared information.

The fifth aspect enables colors already used for identification and colors not yet used for identification to be distinguished between when selecting a color to identify the prepared information.

The sixth aspect enables display of prepared information arrange in a sequence determined by language or headword even when the color to identify prepared information is the same.

The seventh aspect enables the sequence for arranging the prepared information to be changed.

The eighth aspect enables prepared information to be searched using a color to identify the prepared information.

The ninth aspect enables display of an index not restricted in the number of items of displayable information in an index to find a location of information representing a contact.

The tenth aspect enables display of an index not restricted in the number of items of displayable information in an index to find a location of information representing a print job.

The eleventh aspect raises visibility compared to a case in which plural items of prepared information and the color index are displayed at separate timings.

BRIEF DESCRIPTION OF DRAWINGS

FIG. 2 is a block diagram illustrating an example of a configuration of a prepared information database according to an exemplary embodiment.

FIG. 5 is a face-on view illustrating an example of a prepared information table screen priority-displaying with first prepared information according to an exemplary embodiment in which.

FIG. 7 is a face-on view illustrating an example of a storage screen according to an exemplary embodiment.

FIG. 13 is a flowchart illustrating an example of a flow of information processing according to a second exemplary embodiment.

FIG. 14 is a face-on view illustrating an example of a prepared information table screen displayed with a language selection field according to the second exemplary embodiment.

FIG. 15 is a face-on view illustrating an example of a prepared information table screen priority-displayed with second prepared information according to the second exemplary embodiment.

FIG. 16 is a flowchart illustrating an example of a flow of information processing according to a third exemplary embodiment.

FIG. 17 is a face-on view illustrating an example of a prepared information table screen displayed with a headword language selection field according to the third exemplary embodiment.

FIG. 18 is a face-on view illustrating an example of a prepared information table screen priority-displayed with third prepared information according to the third exemplary embodiment.

DESCRIPTION OF EMBODIMENTS

First Exemplary Embodiment

Figure 1:
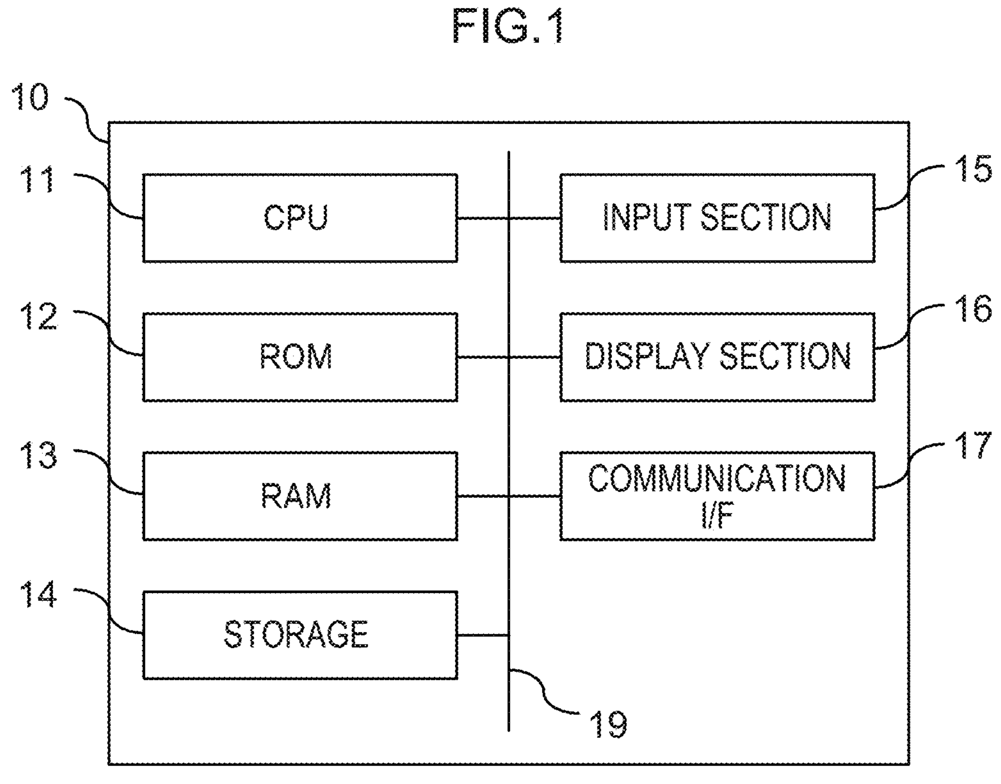
FIG. 1 is a schematic configuration diagram illustrating an example of a hardware configuration of an information processing device according to an exemplary embodiment.

Description follows regarding an example of an exemplary embodiment of the present disclosure, with reference to the drawings. Note that the same reference numerals will be appended to the same or equivalent configuration elements and portions in each of the drawings. Moreover, dimensional proportions of the drawings are exaggerated for ease of explanation and sometimes differ from actual proportions.

First description follows regarding a configuration of an information processing device 10, with reference to FIG. 1.

As illustrated in FIG. 1, the information processing device 10 includes each configuration of a central processing unit (CPU) 11, read only memory (ROM) 12, random access memory (RAM) 13, storage 14, an input section 15, a display section 16, and a communication interface (I/F) 17. Each configuration is connected through a bus 19 so as to be capable of communicating with each other.

The CPU 11 is a central processing unit and executes various programs and controls each section. Namely, the CPU 11 reads a program from the ROM 12 or the storage 14, and executes the program using the RAM 13 as workspace. The CPU 11 controls each configuration described above and performs various computational processing according to a program recorded on the ROM 12 or the storage 14. In the present exemplary embodiment an information processing program is stored on the ROM 12 or the storage 14.

The ROM 12 is stored with various programs and various data. The RAM 13 serves as a workspace to temporarily store a program or data. The storage 14 is configured by a hard disk drive (HDD) or solid state drive (SSD) and stores various programs including an operating system and various data. A prepared information database 14A is stored on the storage 14. Details regarding the prepared information database 14A are described later.

The input section 15 includes a pointing device such as a mouse and a keyboard, and is employed to perform various inputs. The display section 16 is a liquid crystal display, for example, and displays various information. The display section 16 may adopt a touch panel approach and also function as the input section 15.

The communication I/F 17 is an interface for communication with other devices and, for example, may employ a standard such as, for example, Ethernet (registered trademark), FDDI, or Wi-Fi (registered trademark).

Next, description follows regarding the prepared information database 14A according to the present exemplary embodiment, with reference to FIG. 2. The prepared information database 14A according to the present exemplary embodiment is stored with prepared information prepared by a user, and a listing color that is a color to identify this prepared information. Each row in FIG. 2 represents an item of prepared information and a listing color. In the present exemplary embodiment information representing a contact and including a name, name-reading, facsimile number, and email address is employed as the prepared information. Moreover, in the present exemplary embodiment the listing colors are stored as RGB values. However, there is no limitation to this example. The listing colors may be stored as Hue Saturation Brightness (HSB) values.

The above name is information to indicate a name identifying a person or an organization. The above name-reading is information to indicate phonetics for reading the corresponding name. The above facsimile number is information to indicate a facsimile number belonging to the corresponding named person or organization. The above email address is information to indicate an email address belonging to the corresponding named person or organization.

Next, description follows regarding operation of the information processing device 10.

Figure 3:
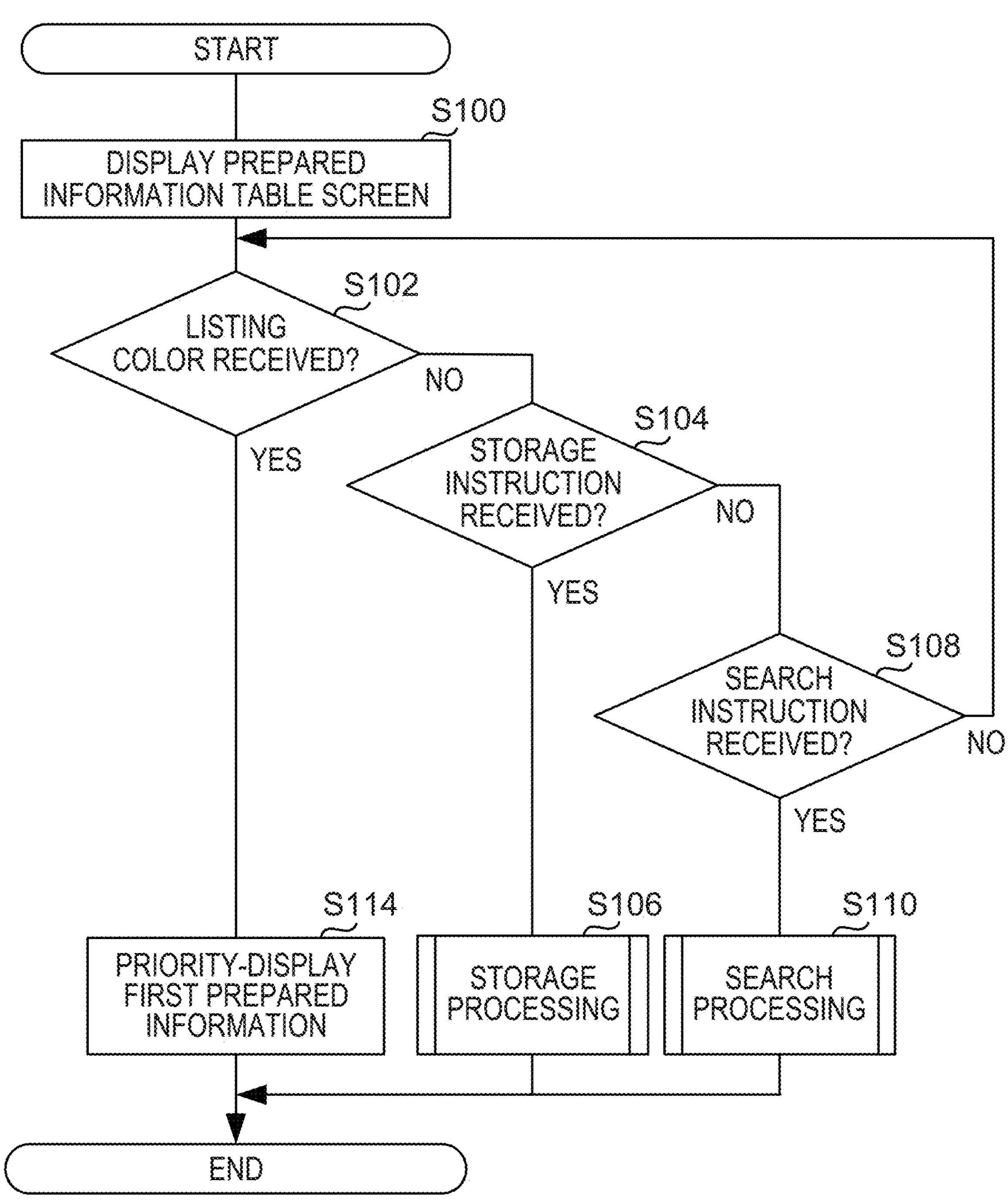
FIG. 3 is a flowchart illustrating an example of a flow of information processing according to a first exemplary embodiment.

First description follows regarding a flow of information processing in the information processing device 10 to priority-display prepared information identified by a listing color received from a user, with reference to FIG. 3. The CPU 11 reads an information processing program from the ROM 12 or the storage 14, and performs information processing by expanding and executing the information processing program in the RAM 13.

At step S100 of FIG. 3, the CPU 11 reads out the prepared information database 14A and displays a prepared information table screen according to a predetermined format on the display section 16.

Figure 4:
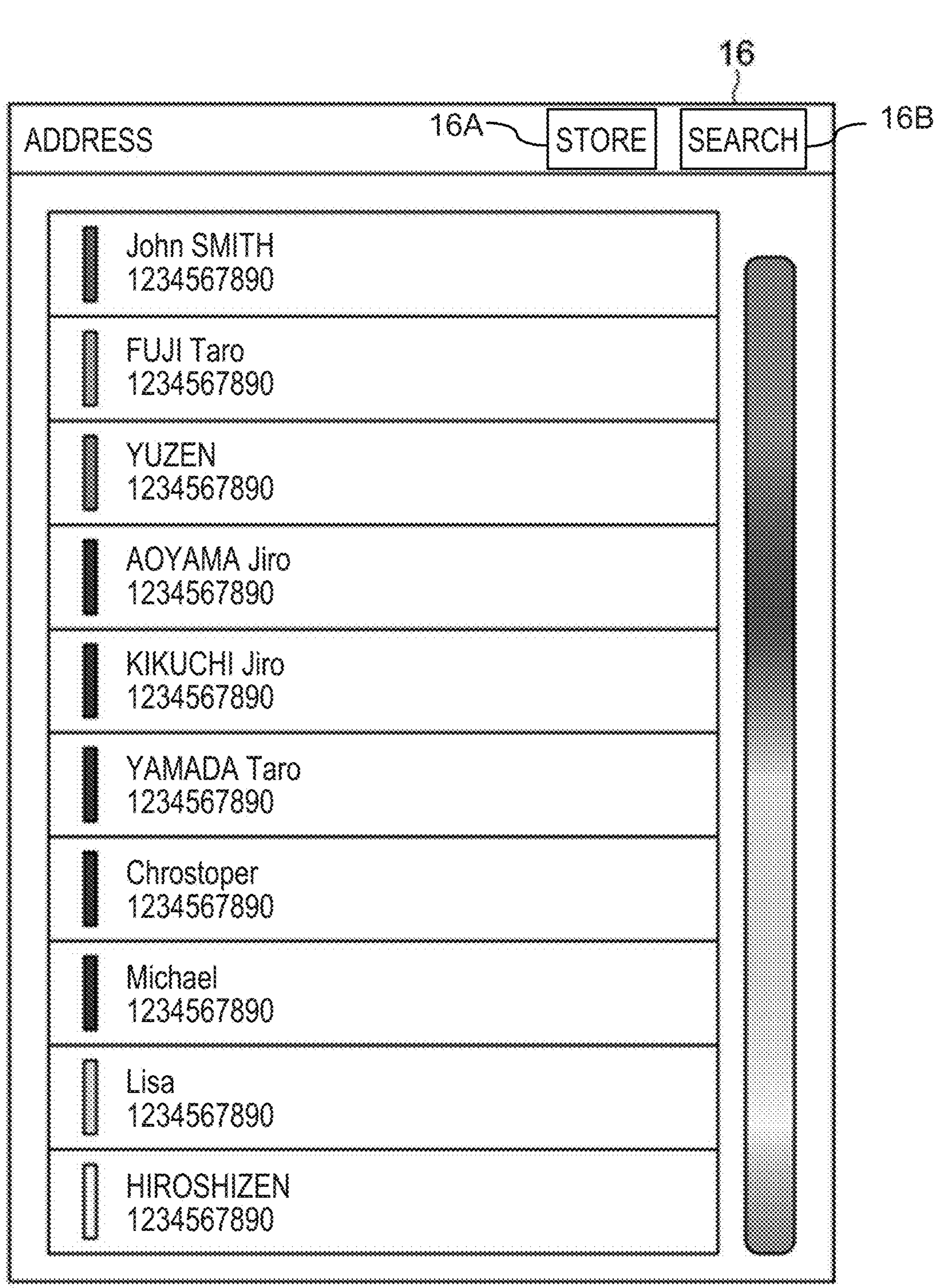
FIG. 4 is a face-on view illustrating an example of a prepared information table screen according to an exemplary embodiment.

As illustrated in FIG. 4, plural items of prepared information displayed together with a listing color, and a color index for selecting a listing color to identify the prepared information for priority-display, are displayed on the prepared information table screen according to the present exemplary embodiment as an address book to display the prepared information. Note that in the present exemplary embodiment, from out of the prepared information only the names and facsimile numbers are displayed on the prepared information table screen. However, there is no limitation thereto. For example, from out of the prepared information only the names may be displayed, or the name, name-reading, facsimile number, and email addresses may be displayed on the prepared information table screen. Moreover, a mode employed in the present exemplary embodiment is one in which plural items of prepared information and the color index are displayed on the prepared information table screen at the same time. However, there is no limitation thereto. The color index may be displayed after the plural items of prepared information have been displayed on the prepared information table screen. Moreover, the plural items of prepared information may be displayed after the color index has been displayed on the prepared information table screen.

Moreover, items of prepared information having different listing colors are displayed on the prepared information table screen according to the present exemplary embodiment arranged in sequence determined by listing color. Moreover, items of the prepared information having the same listing color from out of the prepared information are displayed on the prepared information table screen arranged in sequence determined by language for name storage. Furthermore, on the prepared information table screen items of the prepared information having the same language for name storage and the same listing color are displayed as a table arranged in sequence determined by headword of the name from out of the prepared information.

For example, for cases in which the listing color is the same, consider a case in which prepared information having Japanese as the language for name storage is determined to be displayed above prepared information for which the language is English, then as illustrated in FIG. 4, prepared information for the names “AOYAMA Jiro”, “KIKUCHI Jiro", and "YAMADA Taro" having a listing color of black are displayed arranged above the prepared information for the names "Chrostoper" and "Michael" that have the same listing color of black. Moreover, consider a case in which prepared information having the same language for name storage and listing color is determined so as to be displayed in phonetic sequence of the name headword from out of the prepared information, then as illustrated in FIG. 4, the prepared information for the names "AOYAMA Jiro", "KIKUCHI Jiro", and "YAMADA Taro" having the same Japanese language for name storage and have the same listing color of black are displayed arranged in the phonetic sequence of the name headword in the sequence "AOYAMA Jiro", "KIKUCHI Jiro", and "YAMADA Taro".

However, there is no limitation to this example. For example, on the prepared information table screen the prepared information having the same listing color may be displayed arranged in a sequence determined such as by the date and time when the prepared information was stored. Moreover, the CPU 11 may receive a change to at least one sequence from out of a sequence determined by listing color, a sequence determined by language for name storage out of the prepared information, or a sequence determined by name headword from out of the prepared information, and then display the prepared information as a table in the received sequence.

Moreover, in the present exemplary embodiment, an index of a bar displayed with plural colors by gradation is employed as the color index. However, there is no limitation to this example. For example, an elliptical shaped index of plural colors displayed by gradation may be employed as the color index. A user uses the input section 15 to select from the color index a listing color of the prepared information for priority-display.

Moreover, a store button 16A for storing newly prepared information and a listing color of the prepared information, and a search button 16B to search the prepared information, are displayed on the prepared information table screen according to the present exemplary embodiment.

At step S102, the CPU 11 determines whether or not a listing color selection on the color index displayed on the prepared information table screen has been received through the input section 15. Processing transitions to step S104 when the CPU 11 has determined that a listing color selection on the color index has not been received (step S102: NO).

At step S104, the CPU 11 determines whether or not an instruction to store newly prepared information and listing color of the prepared information has been received, in other words whether or not selection of the store button 16A on the prepared information table screen has been received through the input section 15. Processing transitions to step S106 when the CPU 11 has determined that a selection of the store button 16A has been received on the prepared information table screen (step S104: YES).

At step S106, the CPU 11 executes storage processing that is processing to store newly prepared information and listing color of the prepared information, and then ends the current information processing. The storage processing according to the present exemplary embodiment will be described later with reference to FIG. 6.

On the other hand, processing transitions to step S108 when the CPU 11 has determined at step S104 that selection of the store button 16A on the prepared information table screen has not been received (step S104: NO). At step S108, the CPU 11 determines whether or not an instruction to search the prepared information has been received, in other words whether or not selection of the search button 16B on the prepared information table screen has been received through the input section 15. Processing transitions to step S110 when the CPU 11 has determined that selection of the search button 16B on the prepared information table screen has been received (step S108: YES). However, processing returns to step S102 when the CPU 11 has determined that selection of the search button 16B on the prepared information table screen has not been received (step S108: NO).

At step S110, the CPU 11 executes search processing that is processing to search the prepared information, and then ends the current information processing. The search processing according to the present exemplary embodiment will be described later with reference to FIG. 11.

On the other hand, processing transitions to step S114 when the CPU 11 has determined at step S102 that a selection of a listing color on the color index has been received (step S102: YES). At step S114, the CPU 11 reads out the prepared information identified by the listing color received on the color index at step S102 (hereafter referred to as "first prepared information") from the prepared information database 14A. Then the CPU 11 priority-displays the first prepared information on the prepared information table screen, and ends the current information processing. Note that in the present exemplary embodiment, for a case in which there are plural items of prepared information associated with the listing color received at step S102, the prepared information displayed at the top at step S100 is taken as the first prepared information from out of these plural items of prepared information.

More specifically, at step S114 the CPU 11 displays the first prepared information raised up to the top of the prepared information table screen. Moreover, at step S114 the CPU 11 displays the items of prepared information being displayed below the first prepared information at step S100 each respectively raised by the same number of places as the first prepared information. Moreover, at step S114 the CPU 11 displays the prepared information being displayed one place above the first prepared information at step S100 dropped down to the bottom. Moreover, at step S114 the CPU 11 displays the prepared information being displayed two or more places above the first prepared information at step S100 respectively dropped down by the same number of places as the prepared information dropped down to the bottom.

Figure 5:
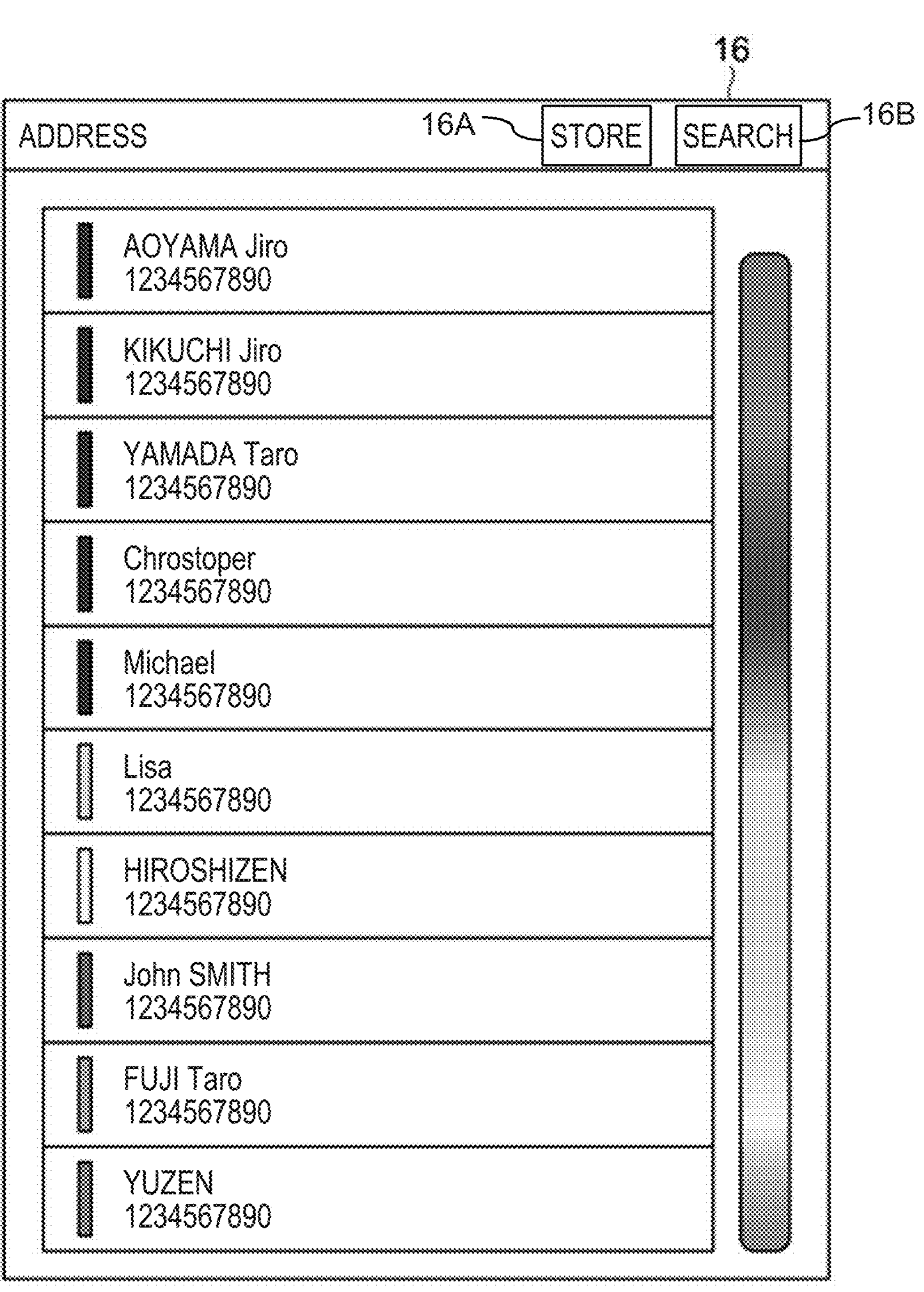

For example, in a case in which black has been selected from the color index at step S102, the prepared information for the name of "AOYAMA Jiro" displayed at the top in FIG. 4 is taken as the first prepared information from out of the prepared information having a listing color of black. Then at step S114, as illustrated in FIG. 5, the prepared information for the name of "AOYAMA Jiro" is displayed raised up to the top of the prepared information table screen. In other words at step S114, prepared information for the name "AOYAMA Jiro" is displayed, as illustrated in FIG. 5, raised by three places from the sequence at which it was displayed in FIG. 4. Moreover, at step S114 the six items of prepared information being displayed below the prepared information for the name "AOYAMA Jiro" in FIG. 4 are displayed raised up by three places as illustrated in FIG. 5. Moreover, at step S114 the prepared information for the name "YUZEN" being displayed one place above the prepared information for the names "AOYAMA Jiro" in FIG. 4 is displayed lowered to the bottom as illustrated in FIG. 5. In other words, at step S114, the prepared information for the name "YUZEN" is displayed lowered by seven places as illustrated in FIG. 5 from the sequence at which it was displayed in FIG. 4. Moreover at step S114, the two items of prepared information being displayed 2 or more places above the prepared information for the name "AOYAMA Jiro" in FIG. 4 are displayed lowered by seven places as illustrated in FIG. 5.

However, there is no limitation to this example. For example, at step S114 the CPU 11 may display only the first prepared information on the prepared information table screen.

Figure 6:
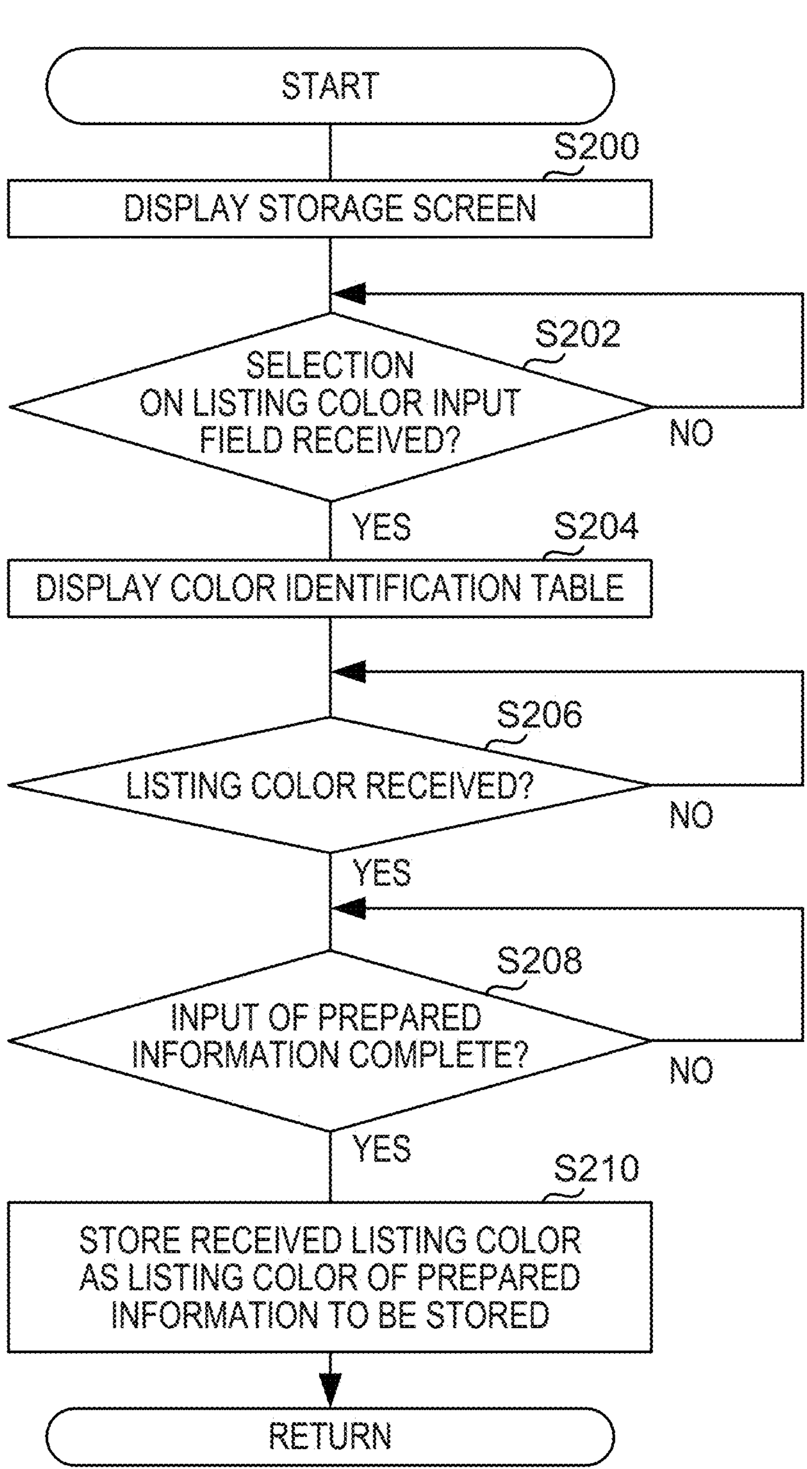
FIG. 6 is flowchart illustrating an example of a flow of storage processing according to an exemplary embodiment.

Next, detailed description follows regarding storage processing according to the present exemplary embodiment, with reference to FIG. 6.

At step S200 of FIG. 6, the CPU 11 displays a storage screen according to a predetermined format on the display section 16.

Figure 7:
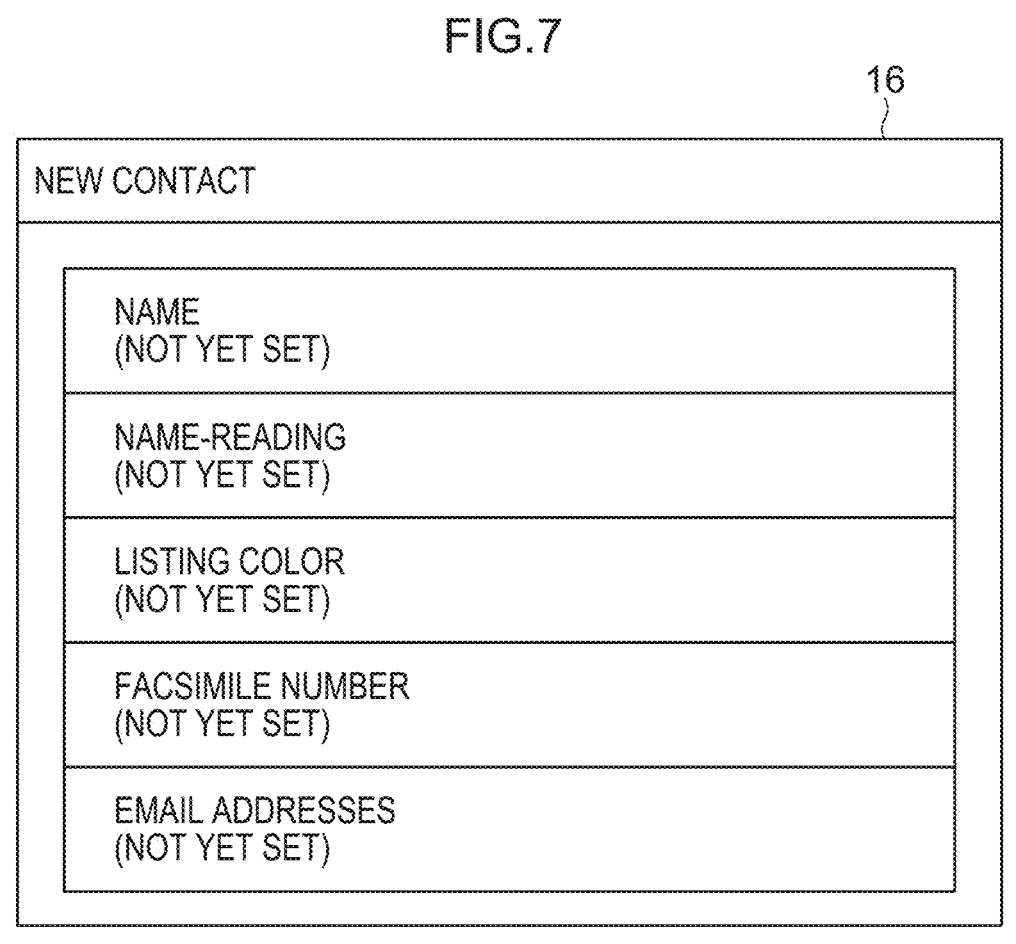

As illustrated in FIG. 7, an input table for storing a new contact is displayed on the storage screen according to the present exemplary embodiment with input fields displayed for inputting name, name-reading, listing color, facsimile number, and email address. When the storage screen has been displayed on the display section 16, a user uses the input section 15 to input the name, name-reading, listing color, facsimile number, and email address.

At step S202, the CPU 11 waits on standby until a selection is received in an input field of listing color through the input section 15. Processing transitions to step S204 when the CPU 11 has received a selection on the input field of listing colors (step S202: YES).

At step S204, the CPU 11 displays a color identification table according to a predetermined format on the display section 16.

Figure 8:
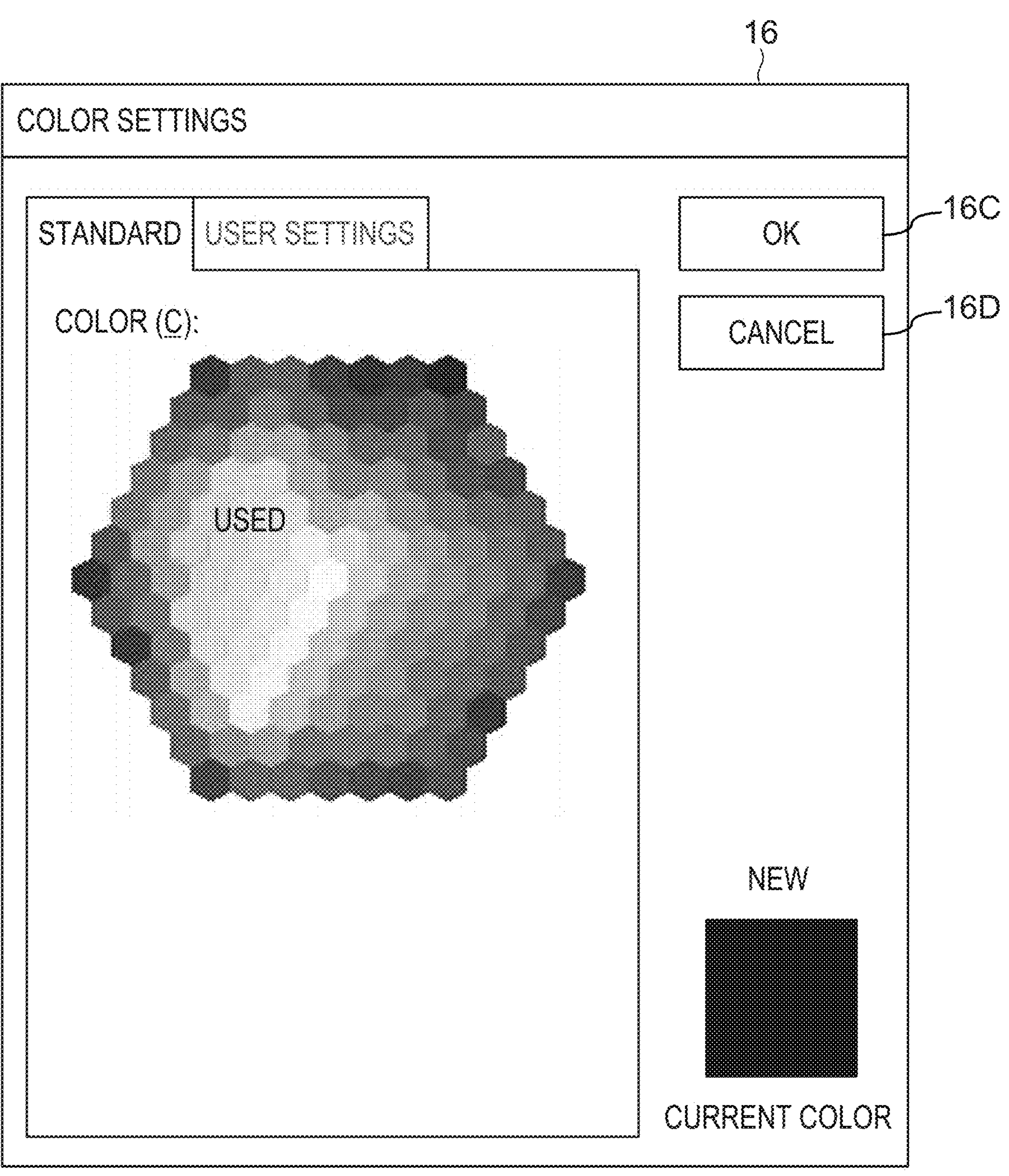
FIG. 8 is a face-on view illustrating an example of a color palette according to an exemplary embodiment.

In the present exemplary embodiment, a screen displaying a color palette as illustrated in FIG. 8 is employed as the color identification table. When the color identification table has been displayed on the display section 16, a user uses the input section 15 to select a listing color from the color palette to identify prepared information to be stored. Note that the listing color selected by the user is displayed in the color identification table as the current color. A user uses the input section 15 to respectively select an OK button 16C when selection of the desired listing color has been possible, and to select a CANCEL button 16D when selection of the desired listing color has not been possible.

Figure 9:
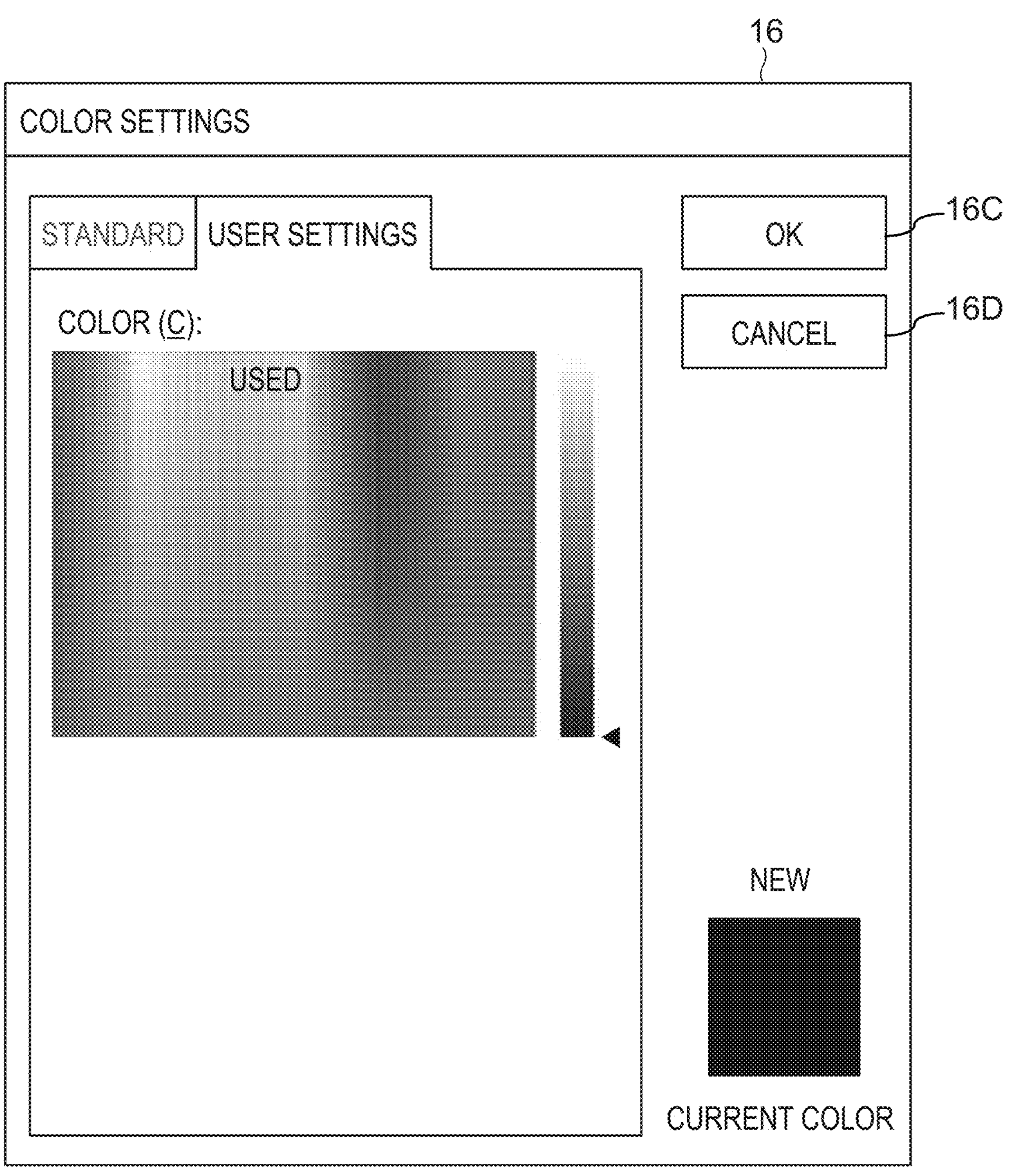
FIG. 9 is a face-on view illustrating an example of a gradation palette according to an exemplary embodiment.

Note that the color identification table is not limited to a screen displayed with a color palette. For example, a screen displayed with a gradation palette as illustrated in FIG. 9 may be employed as the color identification table. In such cases, a user uses the input section 15 to select a listing color to identify the prepared information to be stored from the gradation palette. Note that the listing color selected by the user is displayed on the color identification table as the current color. A user uses the input section 15 to respectively select an OK button 16C when selection of the desired listing color has been possible, and to select a CANCEL button 16D when selection of the desired listing color has not been possible.

Note that in the color identification table according to the present exemplary embodiment, listing colors already identifying prepared information and listing colors not yet identifying prepared information are displayed so as to be distinguished therebetween. In the example illustrated in FIG. 8 and FIG. 9, text of "used" is displayed for a listing color already identifying prepared information.

Figure 10:
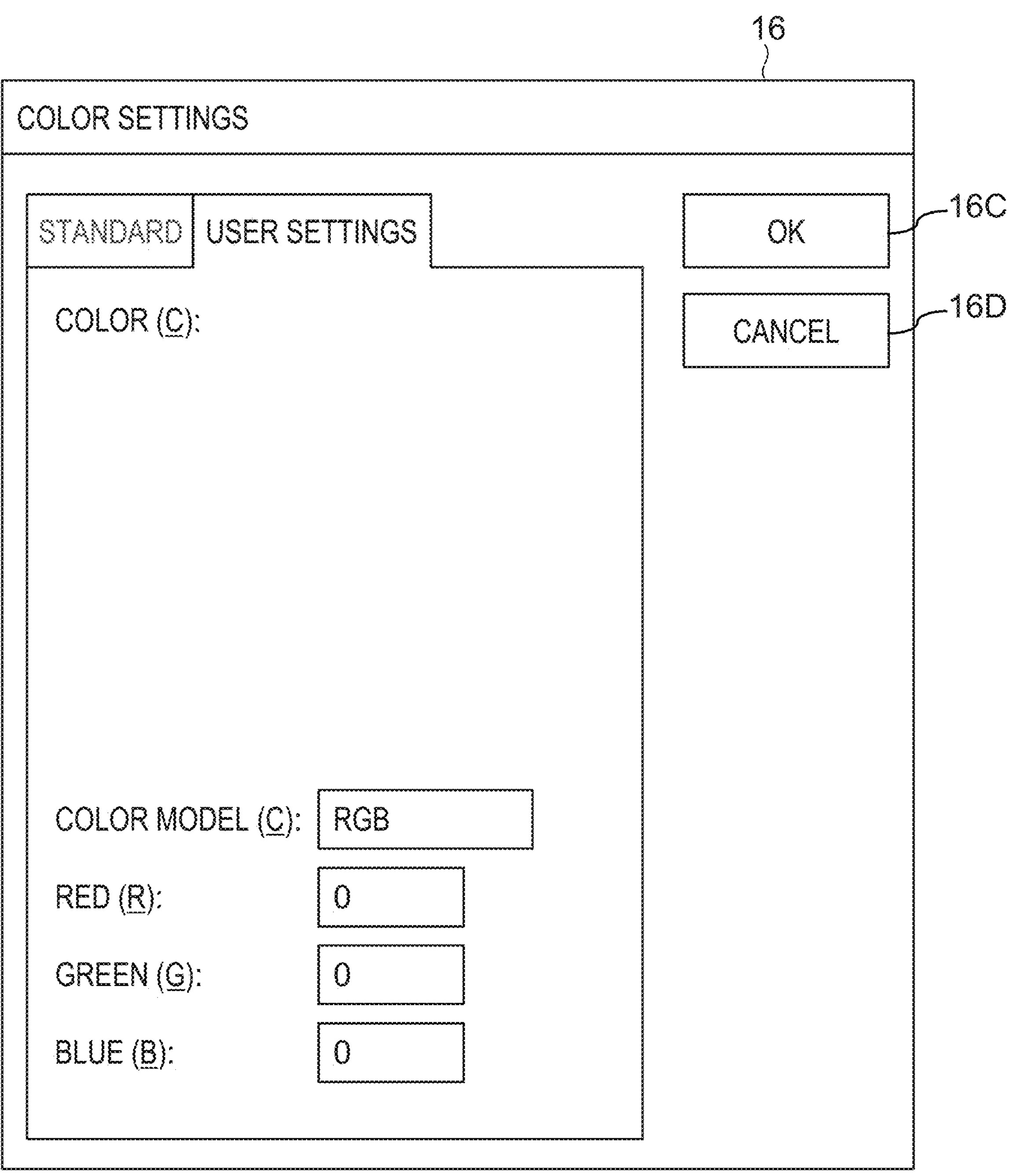
FIG. 10 is a face-on view illustrating an example of a screen enabling input with a RBG value or an HSB value according to an exemplary embodiment.

Moreover, a screen enabling input of RBG values or HSB values as illustrated in FIG. 10 may be employed as the color identification table. In such cases the user uses the input section 15 to select RGB or HSB (RGB in the example illustrated in FIG. 10) from a color model selection field, and then inputs either the RGB value or the HSB value of the listing color to identify the prepared information to be stored. Then the user respectively uses the input section 15 to select the OK button 16C when input of the desired RGB value or HSB value has been possible, or to select the CANCEL button 16D when input of the desired RGB value or HSB value has not been possible.

At step S206, the CPU 11 adopts standby until a listing color selection on the color identification table has been received, in other words until selection of the OK button 16C has been received. Processing transitions to step S208 when the CPU 11 has received a listing color selection through the input section 15 (step S206: YES).

At step S208, the CPU 11 adopts standby until input on the storage screen with all of the name, name-reading, facsimile number, and email address, in other words until completion of input of the prepared information on the storage screen. The CPU 11 transitions to step S210 when input of the prepared information has been completed (step S208: YES).

At step S210, the CPU 11 stores the listing color selected from the color identification table at step S206 as the listing color to identify the prepared information input to the storage screen at step S208, and then ends the current storage processing.

Figure 11:
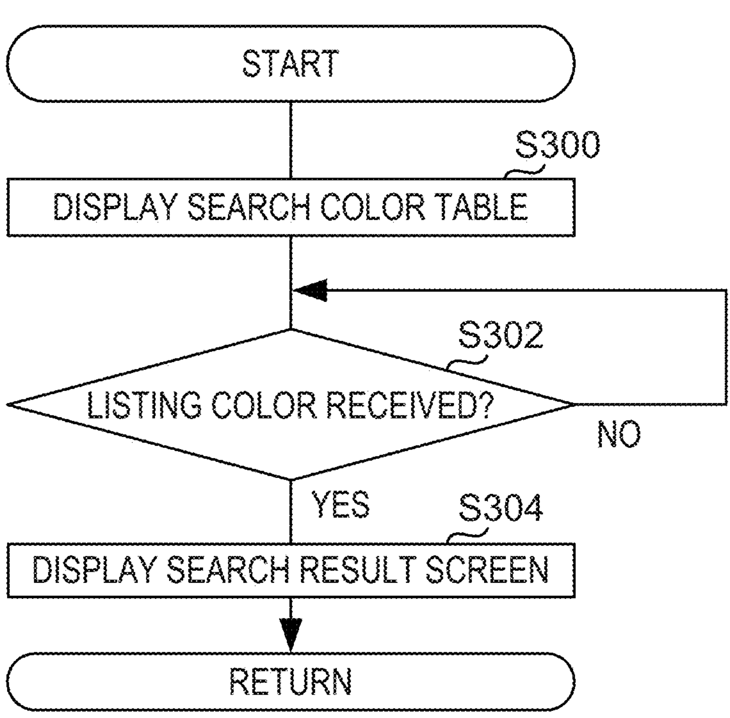
FIG. 11 is a flowchart illustrating an example of a flow of indexing processing according to an exemplary embodiment.

Next, detailed description follows regarding search processing according to the present exemplary embodiment, with reference to FIG. 11.

At step S300 of FIG. 11, the CPU 11 displays a color search table according to a predetermined format on the display section 16.

In the present exemplary embodiment a screen displayed with a color palette as illustrated in FIG. 8 is employed as the color search table. When the color search table has been displayed on the display section 16, the user uses the input section 15 to select a listing color from the color palette to identify prepared information to be searched. Note that the listing color selected by the user is displayed as the current color on the color search table. The user then uses the input section 15 to respectively select the OK button 16C when selection of the desired listing color value has been possible, and to select the CANCEL button 16D when selection of the desired listing color has not been possible.

Note that the color search table is not limited to a screen displayed with a color palette. For example, a screen displayed with a gradation palette as illustrated in FIG. 9 may be employed as the color search table. In such cases, the user uses the input section 15 to select to select the listing color from the gradation palette to identify the prepared information to be searched. Note that the listing color selected by the user is displayed as the current color on the color search table. The user uses the input section 15 to respectively select the OK button 16C when selection of the desired listing color has been possible, and to select the CANCEL button 16D when selection of the desired listing color has not been possible.

Note that in contrast to in the color identification table, the colors already identifying prepared information and colors not yet identifying prepared information are not displayed distinguished therebetween in the color search table according to the present exemplary embodiment.

Moreover, a screen enabling input of RBG values or HSB values as illustrated in FIG. 10 may be employed as the color search table. In such cases the user uses the input section 15 to select RGB or HSB (RGB in the example illustrated in FIG. 10) from the color model selection field, and then inputs either the RGB value or the HSB value of the listing color to identify the prepared information to be searched. The user uses the input section 15 to respectively select the OK button 16C when input of the desired RGB value or HSB value has been possible, and to select the CANCEL button 16D when input of the desired RGB value or HSB value has not been possible.

At step S302, the CPU 11 adopts standby until a listing color selection has been received on the color search table, in other words until selection of the OK button 16C has been received. Processing transitions to step S304 when the CPU 11 has received a listing color selection on the color search table (step S302: YES).

At step S304, the CPU 11 displays a search result screen according to a predetermined format on the display section 16, and then ends the current search processing.

Figure 12:
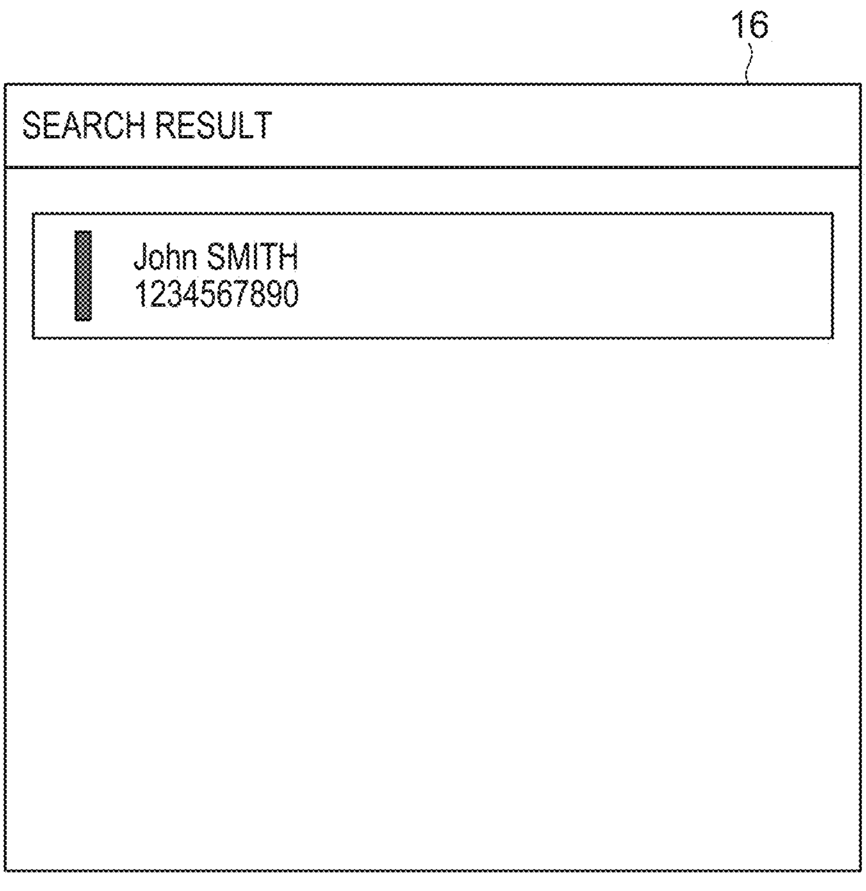
FIG. 12 is a face-on view illustrating an example of an index screen according to an exemplary embodiment.

As illustrated in FIG. 12, a name and facsimile number of the prepared information identified by the listing color received at step S302 is displayed on a search result screen according to the present exemplary embodiment.

Second Exemplary Embodiment

In the first exemplary embodiment, when there were plural items of prepared information associated with the listing color received on the color index, the prepared information displayed at the top at step S100 of the information processing is priority-displayed from out of plural items of prepared information. In the second exemplary embodiment, the prepared information related to a selected headword is priority-displayed when there are plural items of prepared information associated with the listing color received on the color index. Description follows regarding points of difference to the first exemplary embodiment. Note that since the hardware configuration is the same as that of the first exemplary embodiment, duplicate explanation will be omitted thereof.

Description follows regarding a flow of information processing in the information processing device 10 of the present exemplary embodiment, with reference to FIG. 13. Note that the same step numbers to those in FIG. 3 are appended to steps for executing the same processing to in the flow of information processing illustrated in FIG. 3, and explanation thereof will be omitted.

A point of difference between the flow of information processing illustrated in FIG. 3 and the flow of information processing illustrated in FIG. 13 is the addition of the processing of step S112, and step S116 to step S120.

At step S112 of FIG. 13, the CPU 11 determines whether or not there are plural items of prepared information in the prepared information database 14A associated with the listing color received at step S102. Processing transitions to step S114 when the CPU 11 has determined that there is only one item of prepared information associated with the received listing color (step S112: NO). On the other hand, processing transitions to step S116 when the CPU 11 has determined that there are plural items of prepared information associated with the received listing color (step S112: YES).

At step S116, the CPU 11 displays a selection field to select a language (hereafter referred to as a "language selection field") on the prepared information table screen.

Figure 14:
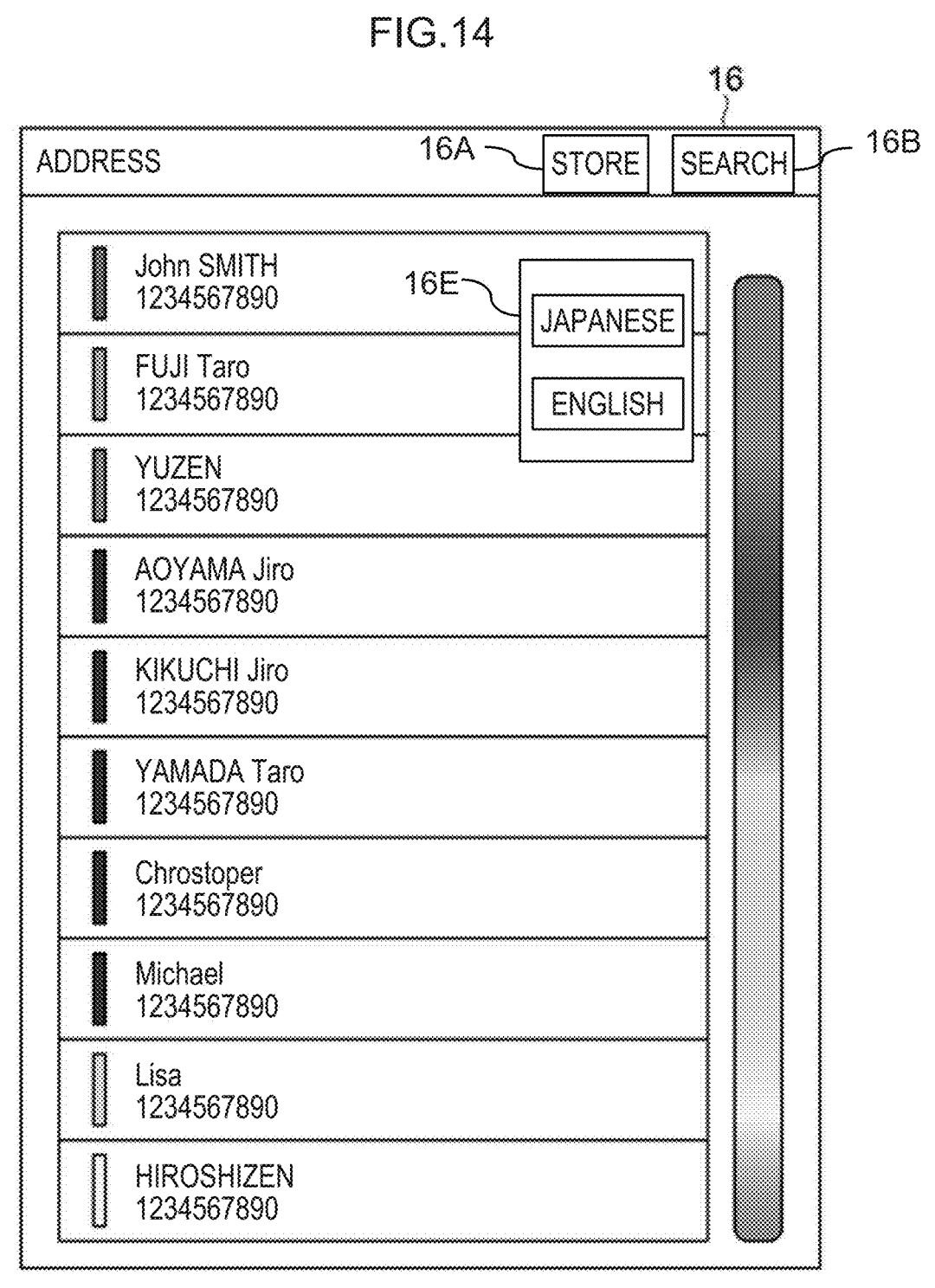

As illustrated in FIG. 14, at step S116 a language selection field 16E is displayed on the prepared information table screen. The user uses the input section 15 to select one of the languages from the language selection field 16E ("Japanese" or "English" in the example illustrated in FIG. 14).

At step S118, the CPU 11 adopts standby until a language selection has been received on the language selection field 16E being displayed on the prepared information table screen. Processing transitions to step S120 when the CPU 11 has received a language selection from the language selection field 16E (step S118: YES).

At step S120, the CPU 11 reads from the prepared information database 14A prepared information that is identified by the listing color received from the color index at step S102 and that also has a name stored in the language received at step S118 (hereafter referred to as "second prepared information"). The CPU 11 then priority-displays the second prepared information on the prepared information table screen, and ends the current information processing. Note that in the present exemplary embodiment, in cases in which there are plural items of prepared information that are identified by the listing color received on the color index at step S102 and that also have a name stored in the language received at step S118, from out of the plural items of prepared information, the CPU 11 takes the prepared information that was displayed at the top at step S100 as the second prepared information.

Specifically at step S120, the CPU 11 raises display of the second prepared information up to the top of the prepared information table screen. Moreover at step S120, the CPU 11 respectively raises display of the prepared information that was displayed below the second prepared information at step S100 by the same number of places as the second prepared information. Moreover at step S120, the CPU 11 drops display of the prepared information that was displayed one place above the second prepared information at step S100 to the bottom. Moreover at step S120, the CPU 11 respectively drops display of the prepared information that was displayed two or more places above the second prepared information at step S100 by the same number of places as the prepared information dropped to the bottom.

Figure 15:
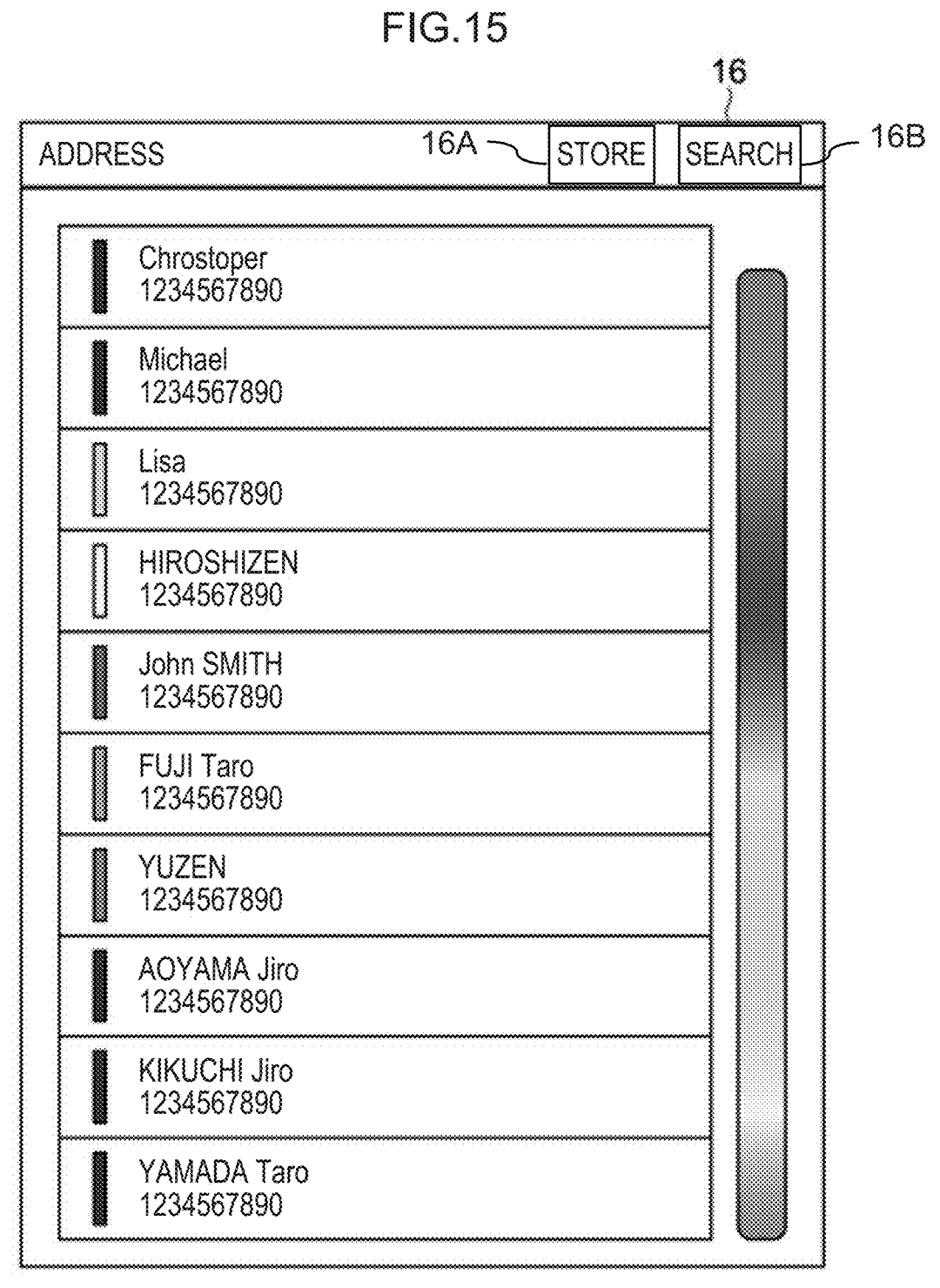

For example, in a case in which black has been selected from the color index at step S102 and English has been selected at step S118, the prepared information for the name "Chrostoper" in the example illustrated in FIG. 4 is taken as the second prepared information. Then at step S120, display of the prepared information for the name "Chrostoper" is raised to the top of the prepared information table screen as illustrated in FIG. 15. In other words, at step S120 the prepared information for the name "Chrostoper" is displayed as illustrated in FIG. 15 raised by six places from the sequence it was displayed at in FIG. 4. Moreover at step S120, the three items of prepared information that were displayed below the prepared information for the name "Chrostoper" in FIG. 4 are displayed raised up by six places as illustrated in FIG. 15. Moreover at step S120, the prepared information for the name "YAMADA Taro" that was displayed one place above the prepared information for the name "Chrostoper" in FIG. 4 is displayed dropped to the bottom as illustrated in FIG. 15. In other words, at step S120 the prepared information for the name "YAMADA Taro" is displayed dropped by four places as illustrated in FIG. 15 from the sequence it was displayed at in FIG. 4. Moreover at step S120, the five items of prepared information that were displayed two or more places above the prepared information for the name "Chrostoper" in FIG. 4 are displayed lowered by four places as illustrated in FIG. 15.

Note that at step S120, the CPU 11 may display the second prepared information alone on the prepared information table screen.

Moreover, in cases in which there are plural items of prepared information that are identified by the listing color received from the color index at step S102 and that have a name stored in the language selected at step S118, in the present exemplary embodiment the CPU 11 takes the prepared information that was displayed at the top at step S100 as the second prepared information from out of the plural items of prepared information. However, there is no limitation thereto. In cases in which there are plural items of prepared information that are identified by the listing color received from the color index and that have a name stored in the selected language, the CPU 11 may receive a headword from the user after executing step S118, and then take the prepared information related to the received headword as the second prepared information from out of the plural items of prepared information.

Third Exemplary Embodiment

In the third exemplary embodiment, in cases in which there are plural items of prepared information associated with the listing color received from the color index, the prepared information related to a selected headword is priority-displayed. Explanation follows regarding point of difference to the second exemplary embodiment. Note that since the hardware configuration is the same as that of the second exemplary embodiment, duplicate explanation will be omitted thereof.

Description follows regarding a flow of information processing in the information processing device 10 of the present exemplary embodiment, with reference to FIG. 16. Note that the same step numbers are appended in FIG. 16 to steps for executing the same processing to in the flow of information processing illustrated in FIG. 13, and explanation thereof will be omitted.

A point of difference between the flow of information processing in FIG. 13 and the flow of information processing illustrated in FIG. 16 is that processing from step S122 to step S126 is employed instead of the processing from step S116 to step S120.

At step S122 of FIG. 16, the CPU 11 displays a selection field for selecting a headword (hereafter referred to as a "headword selection field") on the prepared information table screen.

Figure 17:
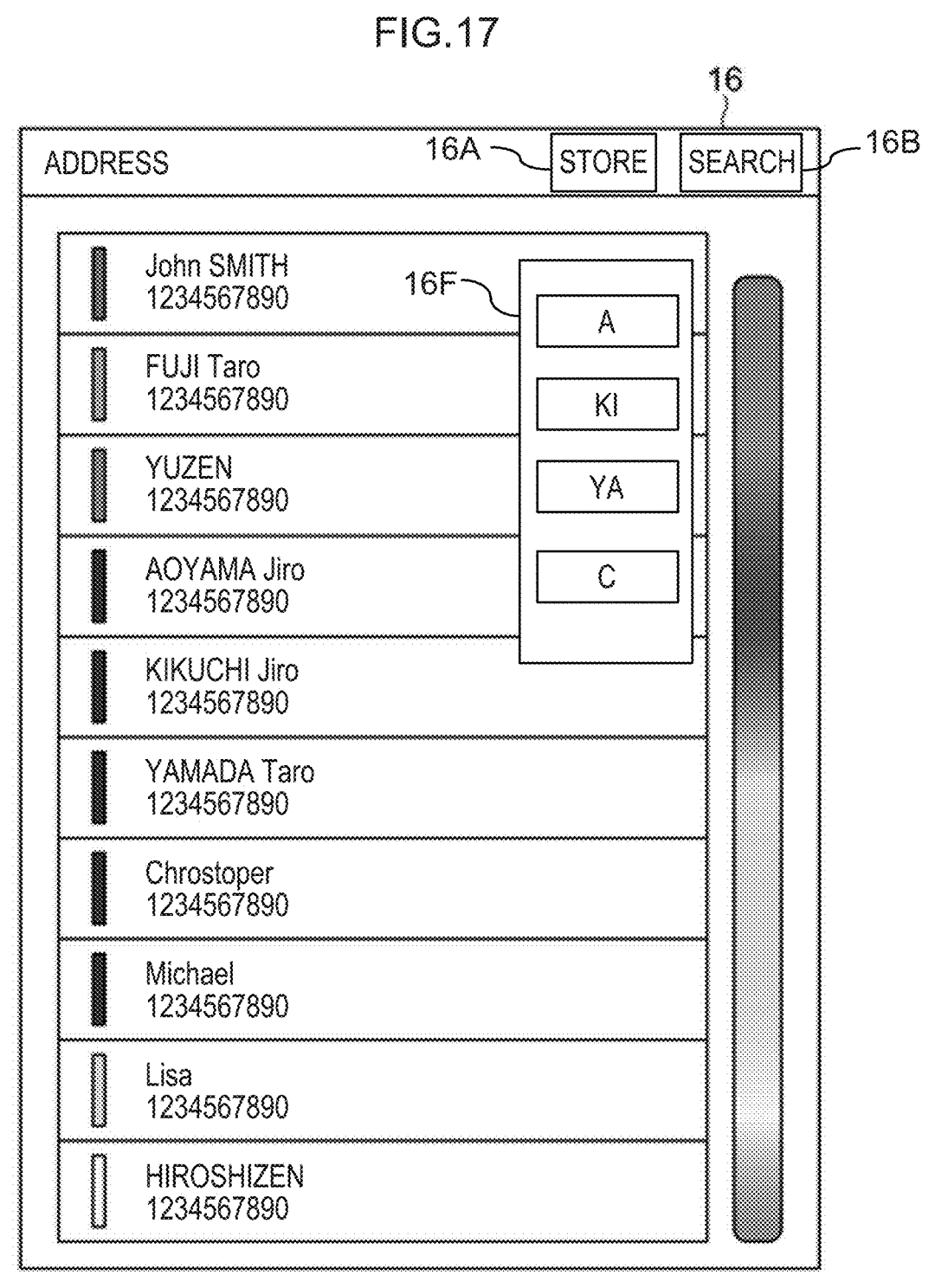

As illustrated in FIG. 17, at step S122 a headword selection field 16F is displayed on the prepared information table screen. The user uses the input section 15 to select one of the headwords from the headword selection field 16F ("A", "KI", "YA", or "C" in the example illustrated in FIG. 17).

At step S124, the CPU 11 adopts standby until a headword selection has been received from the headword selection field 16F being displayed on the prepared information table screen. Processing transitions to step S126 when the CPU 11 has received a headword selection from the headword selection field 16F (step S124: YES).

At step S126, the CPU 11 reads from the prepared information database 14A prepared information that is identified by the listing color received from the color index at step S102 and that is also related to the headword received at step S124 (hereafter referred to as "third prepared information"). The CPU 11 then priority-displays the third prepared information on the prepared information table screen and ends the current information processing. Note that in cases in which there are plural items of prepared information that are identified by the listing color received from the color index at step S102 and that are related to the headword received at step S124, in the present exemplary embodiment the CPU 11 takes the prepared information that was displayed at the top at step S100 as the third prepared information from out of the plural items of prepared information.

Specifically, at step S126 the CPU 11 displays the third prepared information raised up to the top of the prepared information table screen. Moreover at step S126, the CPU 11 respectively raises display of the prepared information that was displayed below the third prepared information at step S100 by the same number of places as the third prepared information. Moreover at step S126, the CPU 11 drops display of the prepared information that was displayed one place above the third prepared information at step S100 to the bottom. Moreover at step S126, the CPU 11 respectively drops display of the prepared information that was displayed two or more places above the third prepared information at step S100 by the same number of places as the prepared information dropped to the bottom.

Figure 18:
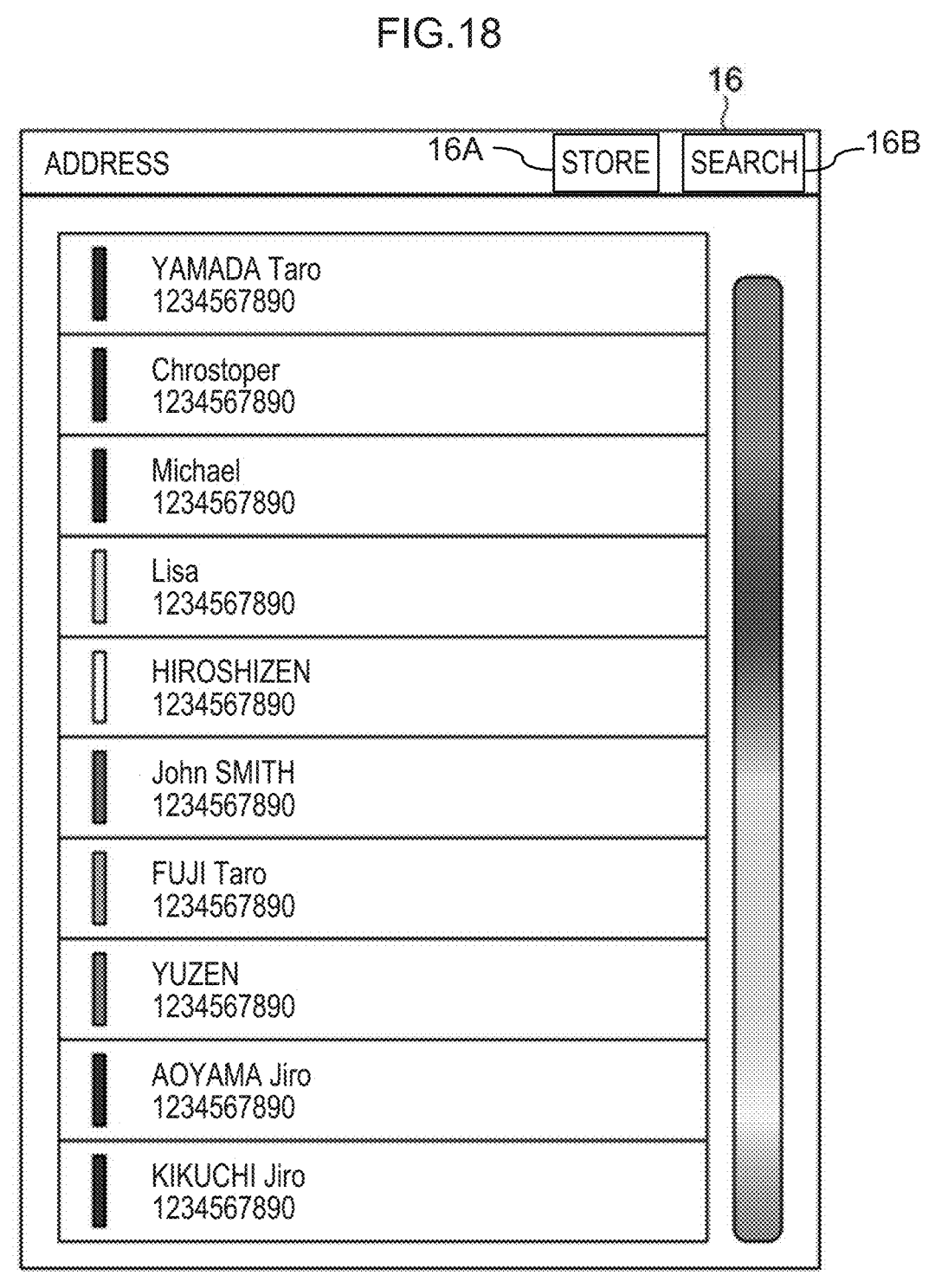

For example, in a case in which black has been selected from the color index at step S102 and "YA" has been selected at step S122, the prepared information for the name "YAMADA Taro" is taken as the third prepared information in the example illustrated in FIG. 4. Then at step S126, the prepared information for the name "YAMADA Taro" is displayed at the top of the prepared information table screen as illustrated in FIG. 18. In other words, at step S126 the prepared information for the name "YAMADA Taro" is displayed as illustrated in FIG. 18 raised by five places from the sequence it was displayed at in FIG. 4. Moreover at step S126, the four items of prepared information that were displayed below the prepared information for the name "YAMADA Taro" in FIG. 4 are displayed raised up by five places as illustrated in FIG. 18. Moreover at step S126, the prepared information for the name "KIKUCHI Jiro" that was displayed one place above the prepared information for the name "YAMADA Taro" in FIG. 4 is displayed dropped to the bottom as illustrated in FIG. 18. In other words, at step S126 the prepared information for the name "KIKUCHI Jiro" is displayed dropped by five places as illustrated in FIG. 18 from the sequence it was displayed at in FIG. 4. Moreover at step S126, the four items of prepared information that were displayed two or more places above the prepared information for the name "YAMADA Taro" in FIG. 4 are displayed lowered by five places as illustrated in FIG. 18.

Note that at step S126, the CPU 11 may display the third prepared information alone on the prepared information table screen.

Moreover, in cases in which there are plural items of prepared information that are identified by the listing color received from the color index at step S102 and that are related to the headword received at step S124, in the present exemplary embodiment the CPU 11 takes the prepared information that was displayed at the top at step S100 as the third prepared information from out of the plural items of prepared information. However, there is no limitation to such an example. In cases in which there are plural items of prepared information that are identified by the listing color received from the color index at step S102 and that are related to the headword received at step S124, the CPU 11 may receive a language from the user after executing step S124, and may take the prepared information having a name stored in the received language as the third prepared information from out of the plural items of prepared information.

This completes explanation of exemplary embodiments, however the technical scope of the present disclosure is not limited by the scope described in the above exemplary embodiments. Various modifications or improvements may be implemented to the above exemplary embodiments within a range not departing from the spirit of the invention, and embodiments resulting from such modifications or improvements are included in the technical scope of the present disclosure.

Moreover, the above exemplary embodiments do not limit the invention according to the claims, and all the features described in the exemplary embodiments do not always need to be combined for the solution to problem of the invention. There are various levels of invention contained in the exemplary embodiments described above, and various inventions may be extracted by combining plural configuration elements disclosed. Even if some configuration elements are omitted from out of all the configuration elements described in the exemplary embodiments, as long as an advantageous effect is obtained then the configuration resulting from omitting these configuration elements may be extracted as the invention.

For example, information representing contacts is employed as the prepared information in the above exemplary embodiments. However, there is no limitation thereto. For example, information representing a print job may be employed as the prepared information. In such cases a color to identify who instructed a print job may be employed as the listing color.

Moreover, in the above exemplary embodiments, a mode is employed in which the color index and plural items of prepared information displayed along with the listing color are displayed on the prepared information table screen. However, there is no limitation thereto. For example, the plural items of prepared information displayed together with the listing color may be displayed on the prepared information table screen and the color index may be displayed on a separate screen.

Moreover, in the exemplary embodiments above a screen is employed to display a color palette as the color identification table and as the color search table. However, there is no limitation thereto. For example, different screens may be employed therefor, such as a screen displayed with a color palette employed as the color identification table and a screen displayed with a gradation palette employed as the color search table.

Moreover, in the exemplary embodiments described above prepared information stored with names in Japanese, Chinese, or English is employed as the prepared information. However, there is no limitation thereto. For example, prepared information stored with names in an Asian language, Korean, or the like in addition to these languages may be employed as the prepared information.

Moreover, "processor" as employed in the above exemplary embodiments indicates a wide definition of processors including general purpose processors (for example a central processing unit (CPU or the like), and custom processors (for example a graphics processing unit (GPU), and programmable logic devices such as an application specific integrated circuit (ASIC), a field programmable gate array (FPGA), or the like).

Moreover, operations of the processor in the exemplary embodiments described above are not limited to being implemented by a single processor alone, and may be implemented by plural processors present at physically separated positions cooperating. Moreover, the sequence of operations of the processor are not limited to the sequences described in the above exemplary embodiments and may be modified as appropriate.

Although in the present exemplary embodiment the information processing program has been described in a mode installed on the ROM 12 or the storage 14, there is no limitation thereto. The information processing program according to the present exemplary embodiment may be provided in a format stored on a computer-readable storage medium. For example, the information processing program according to the present exemplary embodiment may be provided in a format recorded on an optical disc such as on a compact disc (CD)-ROM or a digital versatile disc (DVD)-ROM, or recorded on a semiconductor memory such as a universal serial bus (USB) memory, memory card, or the like. Moreover, the information processing program according to the present exemplary embodiment may be configured so as to be acquired from an external device through the communication I/F 17.

Moreover, in the above exemplary embodiment a case has been described in which the information processing is implemented by executing a program, in a software configuration utilizing a computer, however the present disclosure is not limited thereto. For example, a mode may be adopted in which the information processing is implemented by a hardware configuration, or is implemented by a combination of a hardware configuration and a software configuration.

Also, the configurations of the information processing device 10 as described in the above exemplary embodiments are merely examples thereof, and obviously redundant portions may be removed therefrom and new portions may be added thereto within a range not departing from the spirit of the present disclosure.

Moreover, the flows of processing of the information processing program as descried in the above exemplary embodiments (see FIG. 3, FIG. 13, and FIG. 16) are merely examples thereof, and obviously redundant steps may be removed therefrom, new steps may be added thereto, and the processing sequence thereof may be switched around within a range not departing from the spirit of the present disclosure.

The entire content of the disclosure of Japanese Patent Application No. 2021-137558 is incorporated by reference in the present specification.

All publications, patent applications and technical standards mentioned in the present specification are incorporated by reference in the present specification to the same extent as if each individual publication, patent application, or technical standard was specifically and individually indicated to be incorporated by reference.

The invention claimed is:

1. An information processing device, comprising a processor, wherein the processor:

displays a plurality of items of prepared information prepared by a user and also displays a color index for selecting a color to identify the prepared information to be priority-displayed;

receives a selection of the color from the color index;

moves up and displays, at the top position among the plurality of items of prepared information, prepared information identified based on a predetermined order from among the plurality of items of prepared information associated with the received color;

displays, in a moved-up manner, the items of prepared information that had been displayed below the items of prepared information displayed at the top position;

displays, in a moved-down manner, the items of prepared information that had been displayed above the items of prepared information displayed at the top position;

displays the plurality of items of prepared information, wherein: the prepared information having different colors for the color for identification are arranged in sequence determined by the color; the prepared information having a same color for the color for identification are arranged in sequence determined by a language in which the prepared information is stored; and the prepared information having a same color for identification and having a same language of storage are arranged in sequence determined by a headword of the prepared information; and receives a change to at least one sequence from among the sequence determined by the color, the sequence determined by the language, or the sequence determined by the headword.

2. The information processing device of claim 1, wherein the processor:

in a case in which the prepared information associated with the color received is stored in different languages, receives a language after the color has been received from the color index; and priority-displays the prepared information stored in the language received.

3. The information processing device of claim 1, wherein the processor:

in a case in which there are different headwords for the prepared information associated with the color received, receives a headword after the color has been received from the color index; and priority-displays the prepared information related to the headword received.

4. The information processing device of claim 1, wherein the processor:

in a case in which the prepared information is to be stored, displays a color identification table for selecting a color to identify prepared information to be stored;

receives the color from the color identification table; and stores the color received as the color to identify the prepared information to be stored.

5. The information processing device of claim 4, wherein the processor displays the color already identifying the prepared information in the color identification table so as to be distinguished from the color not yet identifying the prepared information.

6. The information processing device of claim 1, wherein the processor:

displays a color search table for selecting the color to identify the prepared information to be searched; and displays the prepared information identified by the color received from the color search table.

7. The information processing device claim 1, wherein the prepared information is information representing a contact.

8. The information processing device of claim 1, wherein the prepared information is information representing a print job.

9. The information processing device of claim 1, wherein the processor:

displays the plurality of items of prepared information and the color index at a same time;

receives a selection of a color from the color index; and priority-displays the prepared information identified by the color received.

10. A non-transitory computer-readable storage medium storing an information processing program that causes a computer to execute processing comprising:

displaying a plurality of items of prepared information prepared by a user and also displaying a color index for selecting a color to identify the prepared information to be priority-displayed;

receiving a selection of the color from the color index;

moving up and displaying, at the top position among the plurality of items of prepared information, prepared information identified based on a predetermined order from among the plurality of items of prepared information associated with the received color;

displaying, in a moved-up manner, the items of prepared information that had been displayed below the items of prepared information displayed at the top position;

displaying, in a moved-down manner, the items of prepared information that had been displayed above the items of prepared information displayed at the top position;

displaying the plurality of items of prepared information, wherein: the prepared information having different colors for the color for identification are arranged in sequence determined by the color; the prepared information having a same color for the color for identification are arranged in sequence determined by a language in which the prepared information is stored; and the prepared information having a same color for identification and having a same language of storage are arranged in sequence determined by a headword of the prepared information; and receiving a change to at least one sequence from among the sequence determined by the color, the sequence determined by the language, or the sequence determined by the headword.

* * * * *